Dec. 26, 1933.  W. F. PUNTE  1,941,051
DISPENSING CONTAINER
Filed March 25, 1933
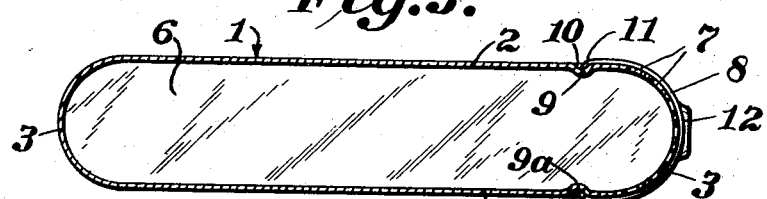
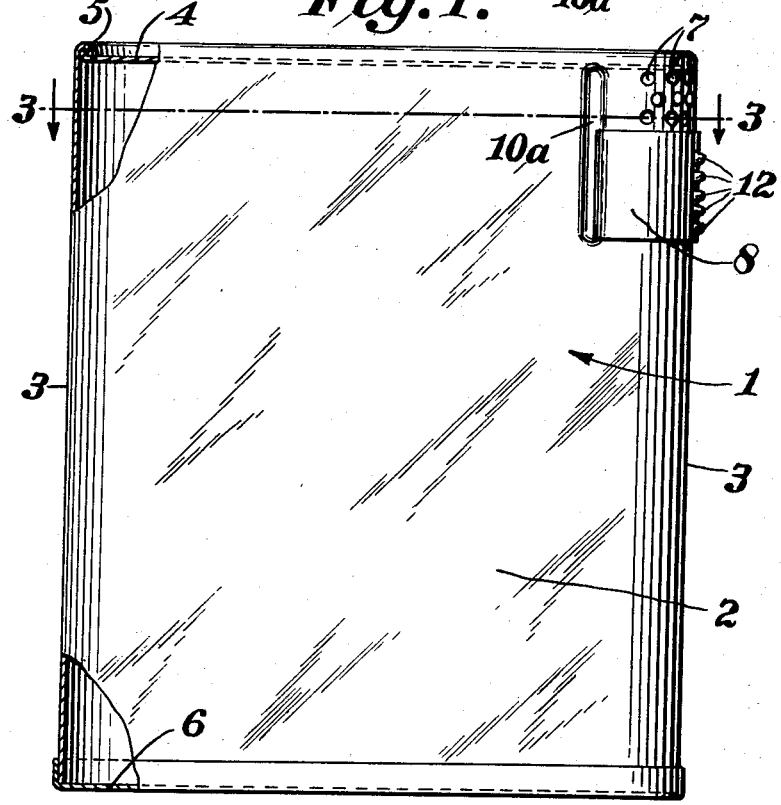
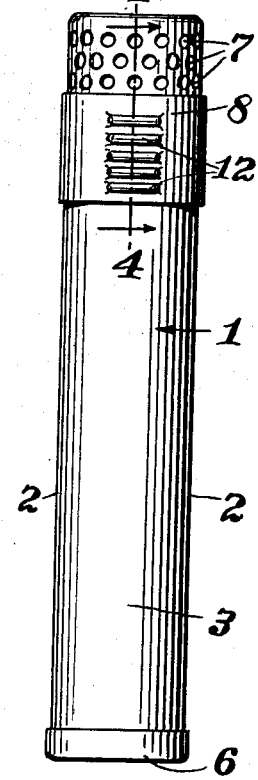
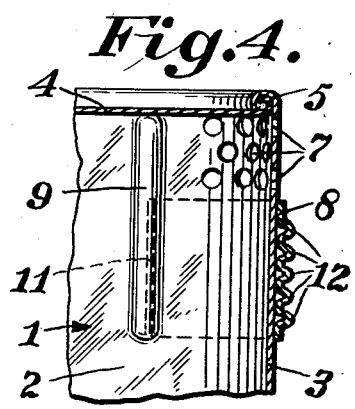
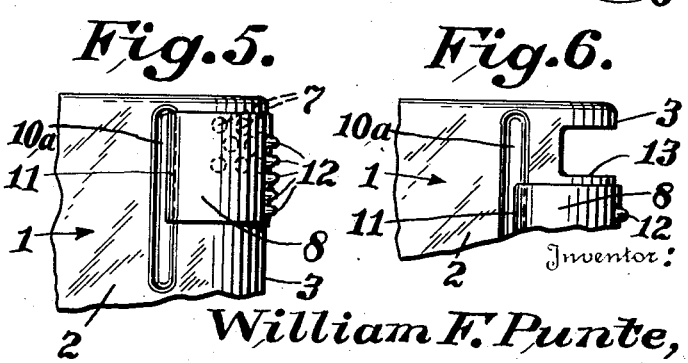
Inventor:
William F. Punte,
By Sturtevant, Mason & Porter
Attorneys Patented Dec. 26, 1933

1,941,051

UNITED STATES PATENT OFFICE 1,941,051

DISPENSING CONTAINER

William F. Punte, Syracuse, N. Y., assignor to Continental Can Company, Inc., New York, N. Y., a corporation of New York Application March 25, 1933. Serial No. 662,809

2 Claims. (Cl. 221—62)

The invention relates to new and useful improvements in a container, and more particularly a container which may be used for dispensing the contents of the container in comparatively small increments.

An object of the invention is to provide a container of the above type wherein the contents may be dispensed through an opening or openings in the side wall of the container disposed close to the closure end of the container so that the entire contents may be dispensed through said opening or openings.

A further object of the invention is to provide a container of the above type with means whereby the opening or openings may be readily closed by a cover member located wholly outside of the container and retained thereon solely through the spring action of the metal forming the cover member.

These and other objects will in part be obvious and will in part be hereinafter more fully disclosed.

In the drawing—

Figure 1 is a side view of a container embodying the invention;

Fig. 2 is an edge view thereof;

Fig. 3 is a sectional view on the line 3—3 of Fig. 1;

Fig. 4 is a vertical sectional view on the line 4—4 of Fig. 2;

Fig. 5 is a view similar to Fig. 4, but showing the cover member moved to a position for closing the dredging openings, and Fig. 6 is a view showing a slightly modified form of discharge opening in the wall of the container.

The invention as shown is applied to a container which is similar in shape to a container that is oval in cross section, except for the fact that the side walls throughout the greater portion of the extent thereof are parallel, while the end walls joining the parallel side walls are circular. A closure is attached to one end of the body portion by an inwardly rolled seam, and this closure is free from pockets or recesses therein. The other end of the body portion is intended to be closed after the container has been filled and the closing end may be attached to the body portion in any suitable way. Discharge openings are formed in the end wall of the container adjacent the first-named closure therefor, and these discharge openings are adapted to be closed by a sliding cover member located wholly outside of the container and bent so as to conform in shape to the container. The container has recesses extending vertically thereof disposed at the inner ends of the cover member, and the cover member has inwardly bent portions which spring into these recesses and serve not only as a means for retaining the cover member on the container, but also as a frictional holding means for holding the cover in its open or closed position.

Referring more in detail to the drawing, the improved container consists of a body portion 1 having substantially parallel side walls 2, 2 and circular end walls 3, 3 connecting the same. Secured to one end of this body portion is a closure 4. The closure 4 is attached to the body portion by an inrolling seam 5. It will be noted that this closure 4 is free from recesses of any character so that the contents of the container will slide freely along the inner surface thereof if the container is inverted or turned on its side so that the contents come into engagement with said end. The other end of the container body is closed by a closure 6 which is provided with a flange and may be soldered thereto, or it may be seamed thereto, or secured in any desired way. The container is filled, after which the end 6 is attached.

In one of the end walls 3 there is a series of openings 7, 7. It will be noted that these openings are in horizontal rows as shown in the drawing, and the uppermost row is directly beneath the closure member 4. These openings are closed by a cover member 8 which is made of metal. The cover member is shaped to conform to the circular end wall. In the side wall 2 adjacent the end wall 3 is an inwardly bent, short vertical bead 9 forming a recess 10 in said wall. In the other wall 2 there is also a bead 9a forming a recess 10a. The extreme inner portions of the cover member 8 are curved inwardly as indicated at 11, and these inwardly curved portions engage within the recesses 10 and 10a, respectively. The cover member is so shaped that while it conforms to the end wall of the container, the end portions are sprung into this groove and have a yielding pressure against the bottom of the groove. The groove as shown in Figures 1 and 4 extends to a position just below the closure member 4. The end walls of the groove serve as stops for limiting the movement of the cover member 8. Said cover member 8 is provided with horizontal ribs 12, 12. It will be noted that the operator holding the container in one hand may readily place the thumb or the finger in engagement with these ribs and slide the container either to closed or open position. The spring of the metal of the closure member will retain it in whatever position it may be set. One row of openings may be uncovered, or two rows, or all three rows, just as desired. When it is desired to dispense the contents of the container, the openings are uncovered and the container is inverted and turned to an angular position, and by a slight shaking thereof, the contents will be dredged through these openings, and the entire contents of the container may be emptied through these openings, due to the fact that there are no beads or recesses forming pockets to entrap the contents of the container. Inasmuch as the openings 7 are directly beneath the closure 4, there is no pocket between the openings and this closure member 4 to entrap material when the container is inverted.

In Fig. 6 of the drawing, there is shown an opening 13 in the container wall in place of the perforations. Otherwise, the container is of the same construction as that above described. This provides the container with an opening through which the contents may be poured, and makes a very excellent container for pocket use and for dispensing tobacco or the like.

It is obvious that minor changes in the details of construction may be made without departing from the spirit of the invention as set forth in the appended claims.

Having thus described the invention, what I claim as new and desire to secure by Letters Patent, is—

1. A container comprising a body portion having an end wall curved in cross section, a closure secured to said body portion, said container body having a discharge opening in said end wall and vertically extending recesses in the wall thereof spaced away from said opening, a cover member conforming to the outer face of said end wall and having the end portions shaped so as to engage said recesses for retaining the cover member in sliding engagement with the container body, said side portions of the cover member being shaped so as to provide a yielding frictional contact with said body of the container in said recesses for retaining the cover member in a set position on said container body.

2. A container comprising a body portion having an end wall curved in cross section, a closure secured to said body portion, said container body having discharge openings in the end wall, some of which are located immediately adjacent the inner face of said closure, said container body having vertically extending recesses in the wall thereof spaced away from said openings, a cover member conforming to the outer face of said end wall and contacting therewith and having end portions shaped so as to engage said recesses for retaining the cover member in sliding contact with the container body, the side portions of the cover member being shaped so as to provide a yielding frictional contact with said body of the container in said recesses for retaining the cover member in set position on the container body.

WILLIAM F. PUNTE.